United States Patent [19]

deOliveria

[11] 4,302,169

[45] Nov. 24, 1981

[54] METHOD AND MOLD FOR MAKING PLASTIC SHOES

[75] Inventor: Jose F. deOliveria, Salem, N.H.

[73] Assignee: Bartex Industries Corp., Waltham, Mass.

[21] Appl. No.: 173,289

[22] Filed: Jul. 29, 1980

[51] Int. Cl.³ .................. B29C 6/00; B29C 7/00; B29D 27/00; B29F 3/00
[52] U.S. Cl. .................. 425/119; 425/129 S
[58] Field of Search .................. 425/119, 129 S

[56] References Cited

U.S. PATENT DOCUMENTS

| | | | |
|---|---|---|---|
| 1,660,881 | 2/1928 | Nielsen | 425/119 |
| 2,390,991 | 12/1945 | Codish | 425/119 X |
| 2,689,375 | 9/1954 | Hugger | 425/119 |
| 2,937,405 | 5/1960 | Berggman et al. | 425/119 |
| 3,016,569 | 1/1962 | Bingham et al. | 425/119 |
| 3,141,195 | 7/1964 | Haas | 425/119 |
| 3,199,149 | 8/1965 | Croyle | 425/119 |
| 3,200,438 | 8/1965 | McIlvin | 425/119 |
| 3,500,502 | 3/1970 | Santelman | 425/119 |
| 3,541,646 | 11/1970 | Bandou | 425/119 |

Primary Examiner—J. Howard Flint, Jr.
Attorney, Agent, or Firm—E. Thorpe Barrett

[57] ABSTRACT

A mold for making plastic shoes that includes a pivotally mounted last within the mold cavity. Means are provided to facilitate removal of the molded shoe by physically displacing one part of the insert from the cavity and then rotating the last out of the mold cavity so that the molded shoe can be removed readily from the last.

6 Claims, 6 Drawing Figures

METHOD AND MOLD FOR MAKING PLASTIC SHOES

BACKGROUND OF THE INVENTION

1. Field of the Invention

This invention relates to the molding of a one-piece shoe from a plastic material such as polyurethane. A mold is provided having an internal cavity corresponding to the outer surface of the shoe and a last positioned within the cavity having a shape corresponding to the inner surface of the shoe. The last is mounted on a movable pivot so that the last can be moved and then rotated to permit removal of the molded shoe.

2. Brief Description of the Prior Art

Shoe manufacturing has traditionally been a labor intensive industry. In addition the most commonly used natural materials have steadily increased in price. These factors have caused a migration of shoe manufacturing facilities into areas of lower labor costs and at the same time have increased the economic advantages in the use of man-made materials. Shoes of various sorts have been made from materials such as rubber, vinyl, polyurethane, and the like. Neither the fabrication of such materials by the traditional shoe manufacturing methods or the molding of an entire shoe has met with widespread acceptance other than for specific and limited applications. There are a variety of causes: lack of permeability to air and water vapor, inability to conform to the shape of a foot different from the last on which the shoe was made, appearance, and cost. The present invention represents a significant improvement in appearance and a reduction in cost, particularly for open-toe shoes for women and children.

Many of the man-made materials such as vinyl and rubber compounds do not faithfully duplicate the fine details of a mold cavity. Polyurethane, however, is capable of replicating a mold surface with such fidelity that it is difficult by visual examination to differentiate between a polyurethane molded article and one made from natural materials. This characteristic of polyurethane has both advantages and disadvantages. Its advantage, of course, is that shoes can be made to meet the exacting requirements of the feminine shopper interested in style, appearance, and quality. But, such a molded polyurethane shoe also faithfully reproduces any defects in the mold and also renders parting lines of the mod most apparent in the final product.

Earlier methods of molding shoes made use of multipiece molds of four or more pieces and which generated a multiplicity of parting lines on the shoe giving an immediate visual indication of the process by which the shoe was manufactured and thus reducing the commerical desirability. It is an object of the present invention to overcome many of these disadvantages and to provide a popular price shoe with such quality and appearance that it can compete successfully with more expensive shoes made by other methods.

SUMMARY OF THE INVENTION

A mold having a cavity formed within two mating mold segments is provided with an insert shoe last that is positioned within the cavity and supported for translational and rotational movement from the cavity of one of the mold segments. In carrying out the invention, polyurethane-forming materials flow into the mold space between the outer surface of the insert last and the inner surface of the mold cavity. The mold is closed and the polyurethane allowed to expand and cure in the usual manner. The cavity is then opened and the last, carrying the molded shoe, is moved outwardly from the cavity and then rotated so that a substantial portion of the last extends from the mold cavity to permit easy removal of the shoe.

PREFERRED EMBODIMENT OF THE INVENTION

Figure 1:
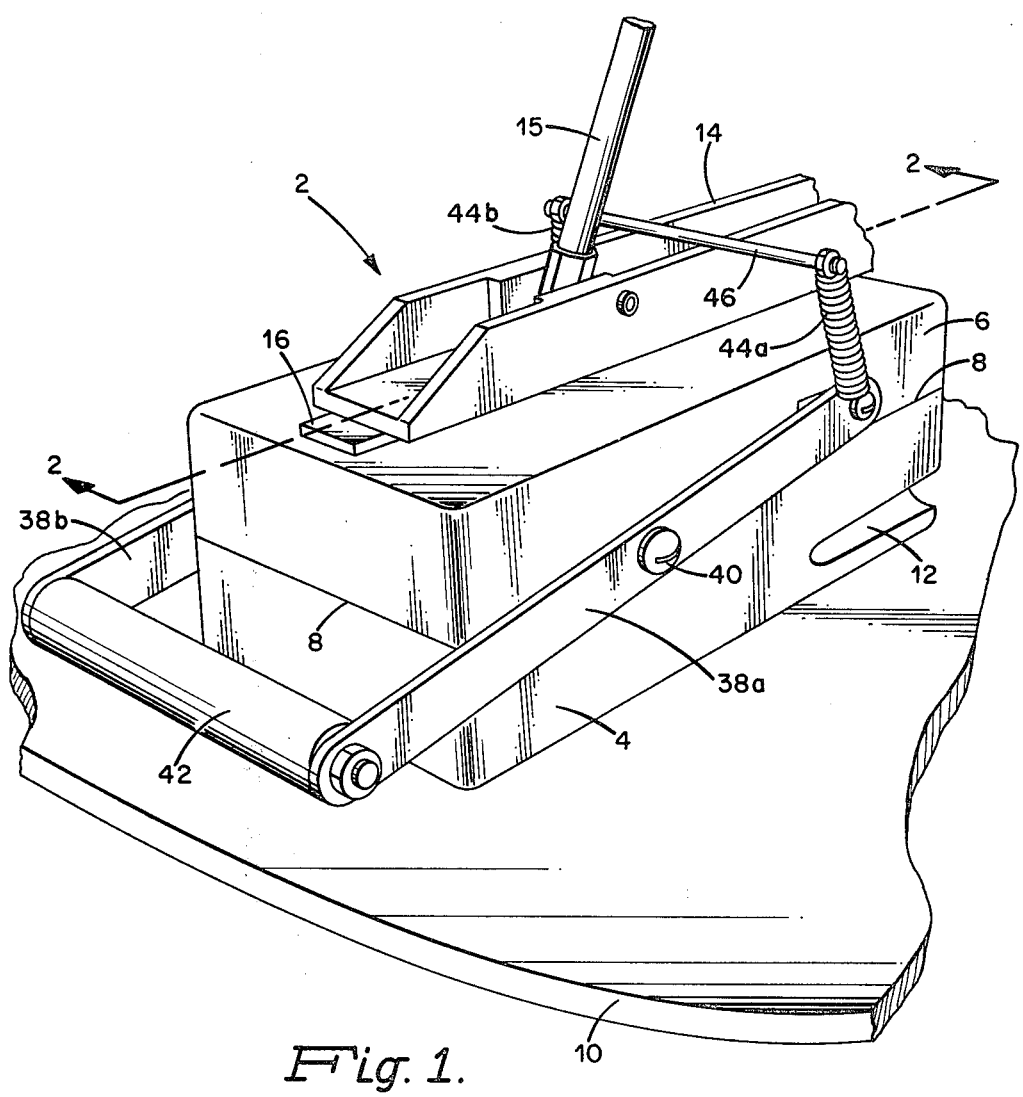
FIG. 1 is a perspective view of a mold for making plastic shoes.
Figure 2:
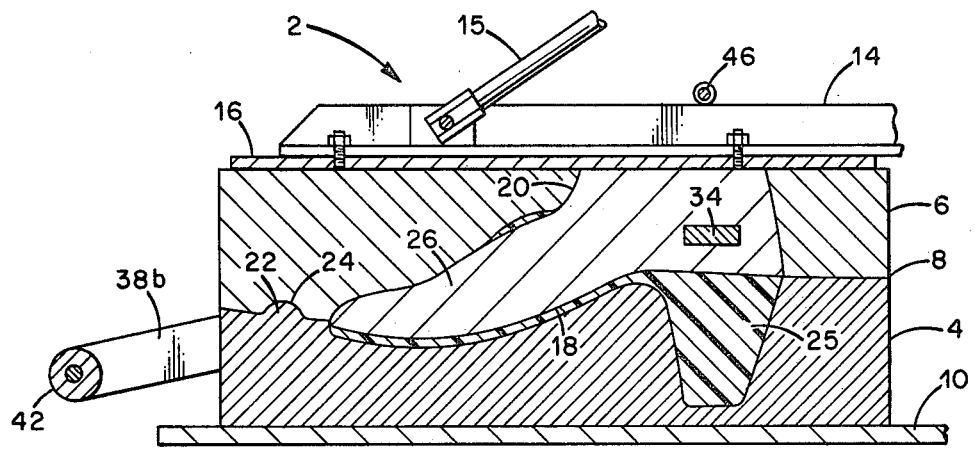
FIG. 2 is a longitudinal sectional view taken generally along line 2—2 of FIG. 1, showing the table supporting the mold and the power-driven arm for opening and closing the mold.
Figure 6:
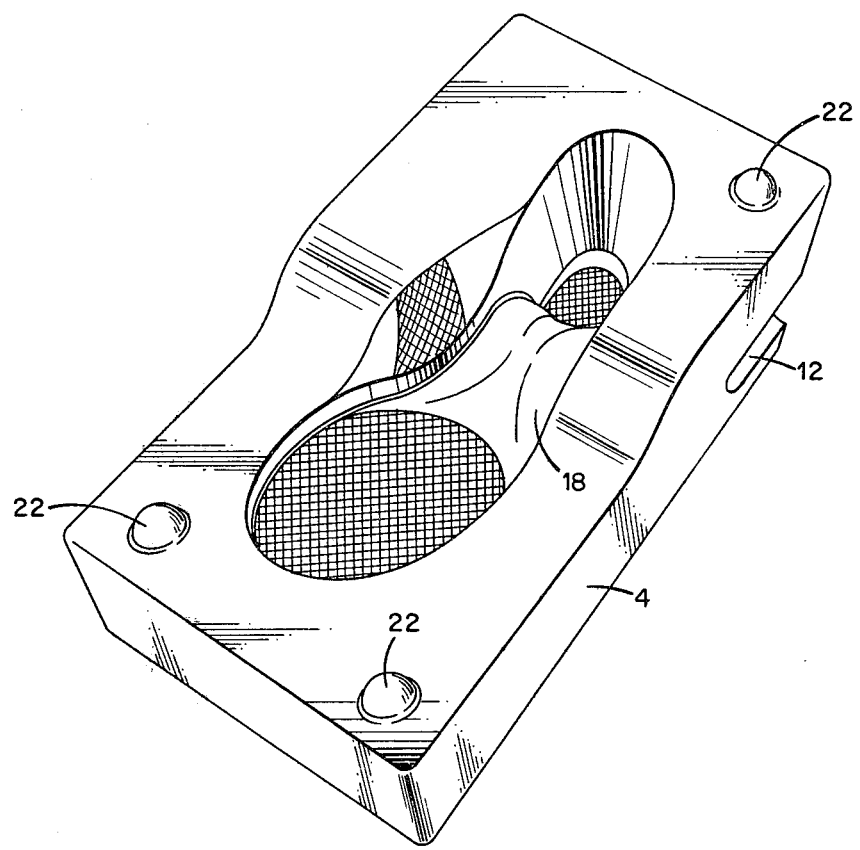
FIG. 6 is a perspective view of the bottom section of the mold.

As shown in FIG. 1, a mold, generally illustrated at 2, includes a lower mold segment 4 and an upper mold segment 6 that engage along a parting line 8. The mold 2 is supported on a rotary table 10 on which it is accurately positioned by two oppositely disposed mold-locating slots 12. The mold is opened and closed by a power-driven arm 14 that is secured to a mold support bar 16 that is in turn secured to the top surface of the upper mold segment 6. The arm 14 is arranged to be rotated, by a hydraulically driven piston extension 15, about a pivot point rearward of the mold 2 so that the upper mold segment when opened is completely separated from the lower mold segment 4 with the forward end of the mold opened the widest as illustrated in FIG. 2. As shown in FIG. 6, the lower mold segment 4 is formed with a cavity recess 18 corresponding to the outer surface of the lower portion of the shoe to be molded. A second cavity recess 20 in the upper mold segment 6 corresponds to the outer surface of the shoe to be molded. Three mold-positioning projections 22 on the upper surface of the lower mold segment are arranged to nest with the corresponding mold alignment receptacles 24 on the lower portion of the upper mold segment to insure precise alignment of the two mold segments.

Figure 3:
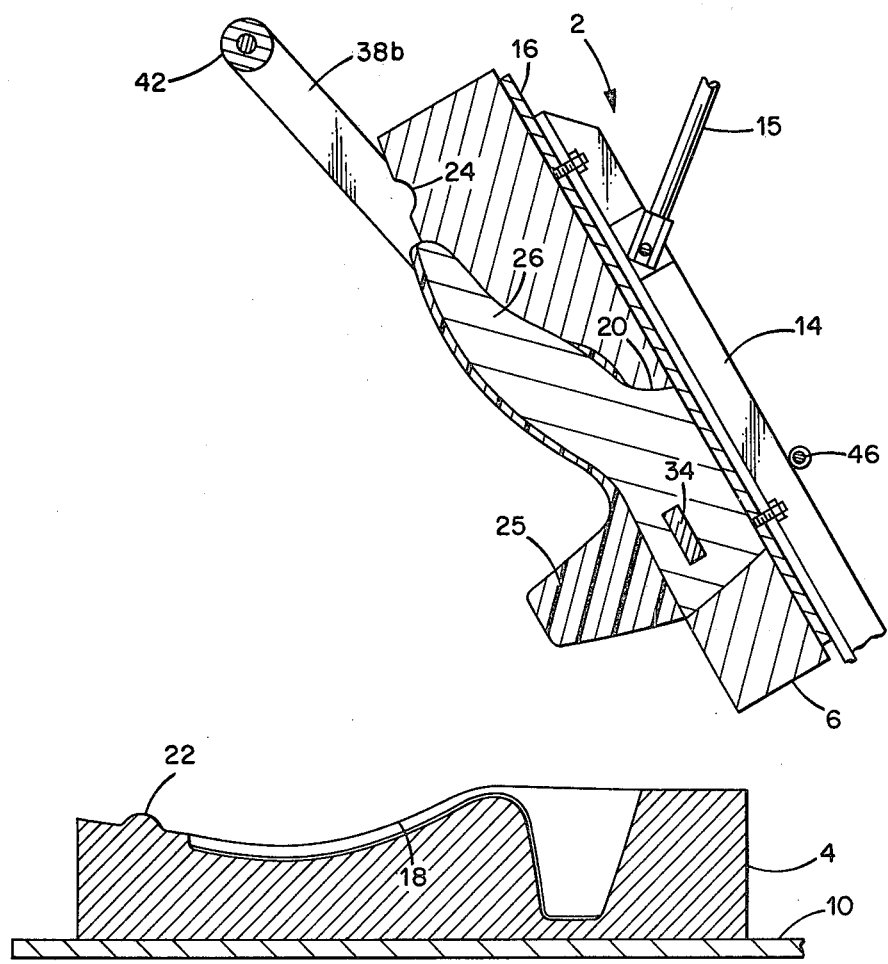
FIG. 3 is a sectional view similar to FIG. 2 showing the mold in open position with the mold insert last in the position it occupies during molding.
Figure 7:
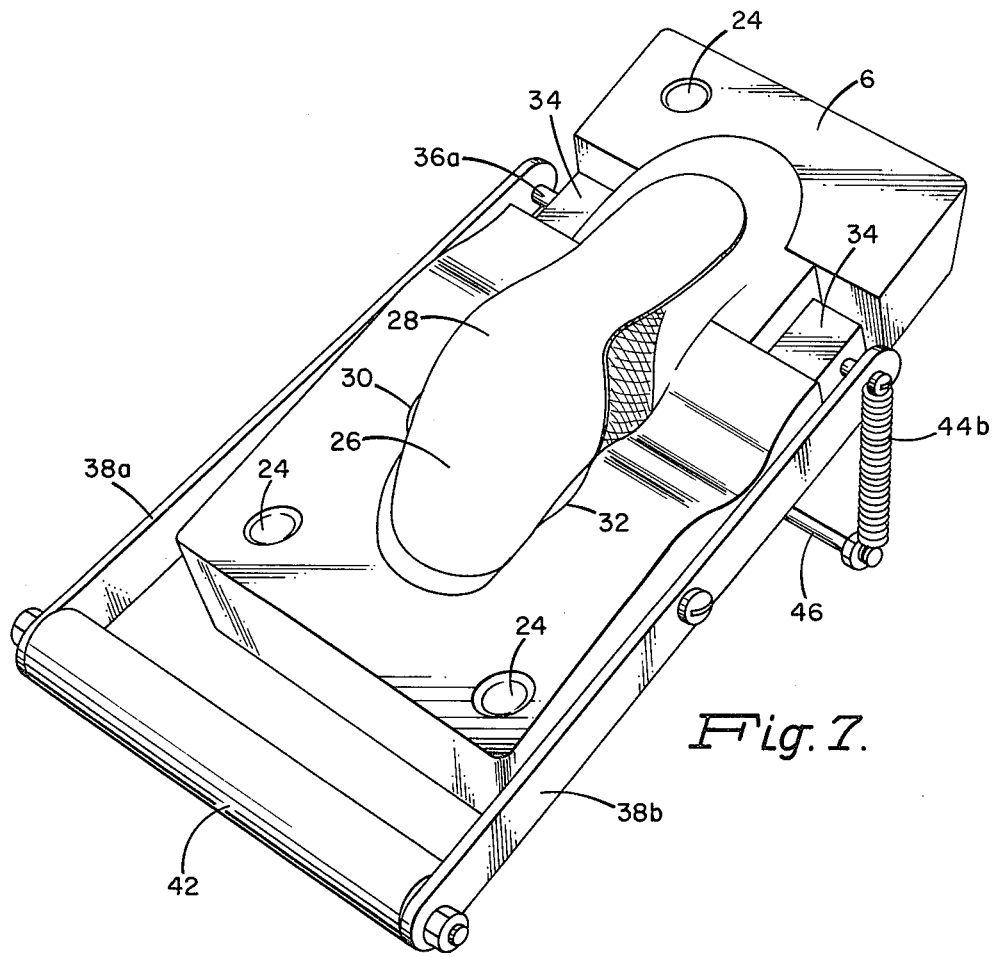
FIG. 7 is a perspective view of the underside of the upper mold section showing the position of the last during the molding operation.
Figure 8:
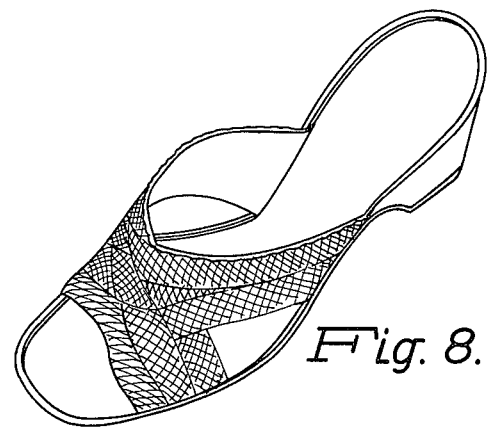
FIG. 8 illustrates a plastic shoe fabricated in accordance with the present invention.

The inner surface of the shoe 25 to be molded is defined by a last generally indicated at 26 that is positioned within the cavity recesses 18 and 20. The last 26 is arranged to nest almost wholly within the recess 20 of the upper mold segment 6, as illustrated in FIGS. 3 and 7. The space between the last 26 and the surface of the recess 20 defines the wall of the upper portion of the shoe, and the bottom surface of the last 26 defines the inner sole surface of the shoe. The recess 18 in the lower mold segment corresponds primarily to the sole and the heel part of the shoe 25 so that the parting line between the two mold segments 4 and 6 occurs preferably along the welt line 27 of the shoe 25 and is accordingly substantially invisible in the finished product.

In use, the measured amount of the components that form the polyurethane are poured into the recess 18 of the lower mold segment 4 and the arm is rotated downwardly to close the mold. As the reaction takes place and the polyurethane expands to fill the mold it is forced upwardly through spaces 30 and 32 (FIG. 7) between the bottom surface 28 of the last and the walls of the cavity recess 20.

Figure 4:
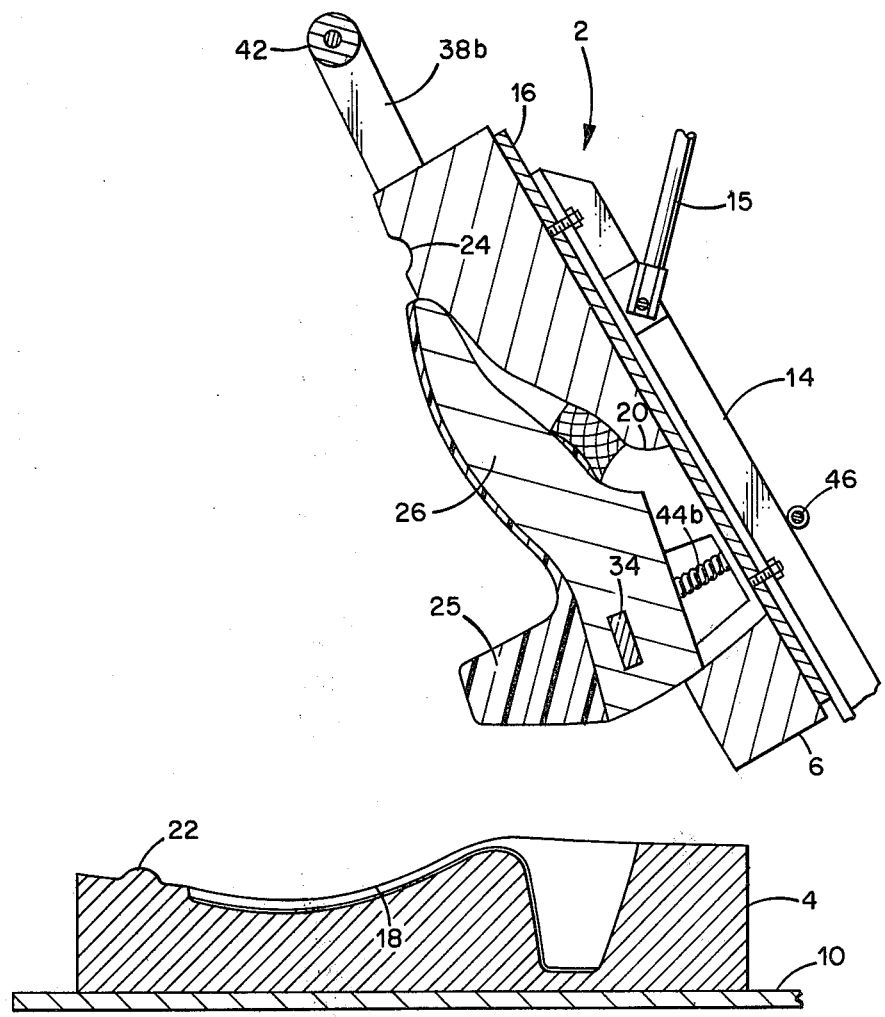
FIG. 4 is a sectional view similar to that shown in FIG. 3 with the pivot support bar of the insert last moved outwardly from the mold cavity.
Figure 5:
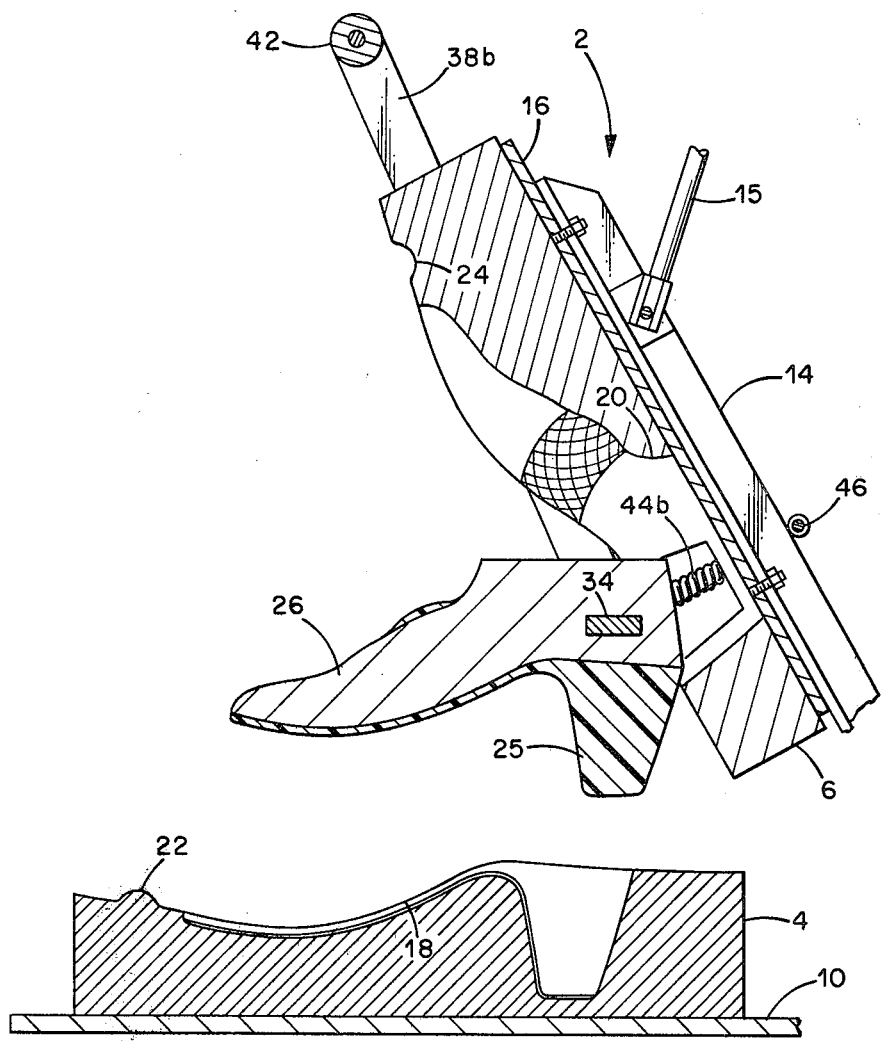
FIG. 5 is a sectional view similar to that of FIG. 4 but in which the insert last has been rotated about its movable pivot to remove it from the cavity of the upper mold section.

The polyurethane is allowed to cure in the usual manner. The mold is then opened by upward movement of the arm 14. In order to permit removal of the molded shoe, the last 26 is mounted on a movable pivot so that it can swing downwardly and then be rotated out of the upper mold recess 20 as illustrated in FIG. 4. This is accomplished by means of a pivot bar 34 that is embedded in and extends through the last 26 protruding on each side as shown in FIG. 7. The bar 34 is preferably of rectangular cross section with substantial strength so that the necessary translational force can be applied symmetrically to the last. Two axles 36a and 36b on opposite ends of the pivot bar 34 may be conveniently formed by machine screws extending through openings near the ends of two actuating levers 38a and 38b into threaded engagement with the respective ends of the pivot bar 34.

The last-actuating levers 38a and 38b are pivotally supported on the upper mold segment 6 by two symmetrically positioned screws that extend through clearance openings in the actuating levers into threaded engagement with the mold segment. The forward ends of the levers 38a and 38b are connected by an operating handle 42 that permits the convenient simultaneous application of force to the two levers. When the handle 42 is moved upwardly, the pivot bar 34 is moved downwardly against the force of two coil springs 44a and 44b so that the rear portion of the mold moves away from the recess 20 in the upper mold segment. This release of the back portion of the molded shoe permits the last 26 to pivot about the axles 36a and 36b and drop by gravity, or other force if necessary, to the position shown in FIG. 4. In this position the shoe is readily stripped from the last.

The springs 44a and 44b, which insure the return of the last 26 to its proper position within the mold recess 20, are secured to the axles 36a and 36b respectively and at their opposite ends are connected to a rod 46 that extends across the upper surface of the mold actuating arm 14.

It will be noted from the foregoing that there are no vertical mold lines nor are there front to rear parting lines along the center of the shoe. Molds which have such parting lines leave a flash ridge, for example vertically along the rear of the heel and on top of the shoe vamp. The absence of such marks by the use of the present invention results in a product with markedly superior commercial acceptance.

From the foregoing, it will be seen that my invention is well adapted to attain the ends and objects herein set forth and that it is subject to a variety of uses and modifications in construction all within the scope of the following claims.

I claim:

1. In a molding apparatus for forming plastic shoes, the combination comprising
    a mold having first and second separable engaged segments defining therein a wholly-enclosed mold cavity,
    a shoe last,
    last-supporting means arranged to support said last within said mold cavity, and
    pivot means pivotally supporting said last-supporting means.

2. Apparatus as claimed in claim 1 wherein said pivotal means includes two pivot supports positioned respectively on opposite sides of said last.

3. Apparatus as claimed in claim 2 including
    actuating means extending outside said cavity and connected to and arranged to move said last-supporting means with respect to said mold, and wherein
    said actuating means includes a first lever arm and means pivotally supporting said arm at a point removed from said last-supporting means.

4. Apparatus as claimed in claim 3 including
    spring bias means coupled to said last and urging said last toward the interior of said first mold segment.

5. Apparatus as claimed in claim 4 wherein
    said actuating means includes a second lever arm positioned on the opposite side of said last from said first lever arm and means pivotally supporting said second arm at a point removed from said pivotal last-supporting means, and
    wherein said spring means includes first and second tension springs coupled respectively to opposite sides of said last.

6. Apparatus as claimed in claim 5 including
    an operating handle rigidly joining said arms at points thereon on the opposite side of said means pivotally supporting the respective arm from the pivotal last-supporting means.

* * * * *